(No Model.) 2 Sheets—Sheet 1.

S. A. DE NORMANVILLE.
VEHICLE BRAKE AND STARTER.

No. 507,033. Patented Oct. 17, 1893.

Witnesses.
H. A. Shepherd
Robert Emett

Inventor.
Samuel A. de Normanville.
By Junius L. Norris.
Atty.

(No Model.) 2 Sheets—Sheet 2.
S. A. DE NORMANVILLE.
VEHICLE BRAKE AND STARTER.
No. 507,033. Patented Oct. 17, 1893.
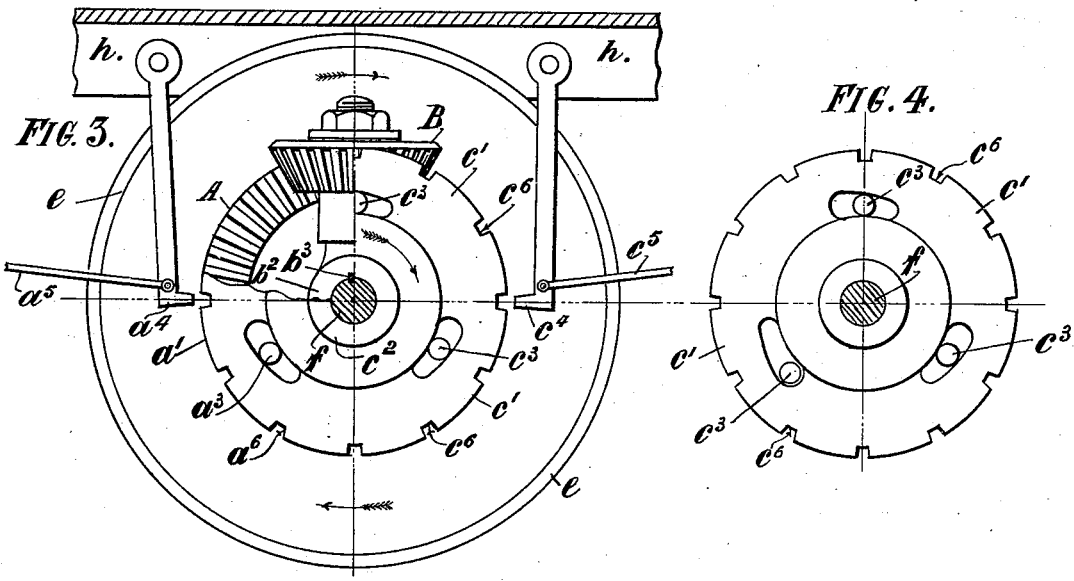
Witnesses.
H. A. Shepherd.
Inventor.
Samuel A. de Normanville.
By James L. Norris.
Atty.

UNITED STATES PATENT OFFICE.

SAMUEL AUGUSTINE DE NORMANVILLE, OF LIVERPOOL, ENGLAND.

VEHICLE BRAKE AND STARTER.

SPECIFICATION forming part of Letters Patent No. 507,033, dated October 17, 1893.

Application filed December 8, 1892. Serial No. 454,522. (No model.)

*To all whom it may concern:*

Be it known that I, SAMUEL AUGUSTINE DE NORMANVILLE, engineer, a subject of the Queen of Great Britain and Ireland, residing at No. 38 Jermyn Street, Liverpool, in the county of Lancaster, England, have invented new and useful Improvements in or Connected with Means for Stopping and Starting Vehicles, of which the following is a specification.

This invention has mainly reference to means for or modes of storing or accumulating the power due to the momentum of a vehicle in motion given out and used in bringing it to a state of rest, or in reducing its rate of speed, and for employing the power so stored or accumulated in overcoming the inertia of the vehicle in restarting it, or increasing its rate of speed. Thus not only does the apparatus or means serve as a brake to the vehicle, but also stores the work so given out (which is ordinarily lost in braking the vehicle) and restores it when restarting.

When the vehicles are drawn by horses, by using this invention, it will be seen, that the great strain ordinarily put upon the animals when starting a car, and overcoming the inertia of it, is obviated.

According to this invention, I employ a spring or springs, tooth, friction, or equivalent gear, arranged on and connected with the axle of the wheel of the vehicle (or in some cases partly on the vehicle and partly on the wheel axle or wheel); a detent or holding device or devices on the car; and in some cases automatically engaging and disengaging mechanism. In action by engaging a detent or holding device with the mechanism, or operating upon the mechanism, as hereinafter described, the power due to the momentum of the vehicle, when bringing it to a state of rest or slowing it, is stored, the spring or springs becoming wound up or coiled, and then upon releasing the detent or holding device, or operating as hereinafter described, the spring or springs either directly or through said tooth, friction, or equivalent gear, act on the axles or wheels of the vehicle and rotate them in the same direction, as they were traveling when the vehicle was stopped or slowed: or in some cases in the reverse direction. Further, by providing another detent or holding mechanism as above described, the stopping or slowing of a vehicle, and the storing and regiving out of work and power in restarting or increasing its rate of speed, will serve for vehicles which are adapted to travel with either end foremost, or for cases in which it is desired to back the vehicle.

The engaging and disengaging mechanism above referred to would comprise an automatic friction clutch device, as for instance, a roller and inclined plane device, or other friction clutch, or pawl and ratchet, or their equivalent.

The tooth, friction, or equivalent gearing above referred to would consist of tooth or friction wheels, such as bevel or spur gearing, by which, in the different arrangements, by holding or stopping one or other of the wheels thereof, or parts connected therewith, (or in some cases by leaving them free,) the desired direction of motion may be given to the vehicle after the spring or springs have been wound or coiled up. A very convenient form of such gearing is a bevel wheel triplet, comprising two bevel wheels on the same axis, say, and a third bevel wheel meshing with said wheels, and mounted on an axle vertical to the axis of said two wheels. The engaging and disengaging mechanism, when employed, would be connected to and adapted to operate in connection with the gearing wheels above specified, while the detent or holding mechanism would, as already stated, engage and disengage with the engaging and disengaging mechanism, accordingly as it is desired that such mechanism should be held or run free: or the detent or holding means may engage directly with said gearing wheels, when the engaging and disengaging mechanism is not employed.

The above being the nature of my invention, I will now describe it with the aid of the accompanying drawings so as to make it fully and clearly understood.

In the different drawings the same letters of reference are used to denote the same or like parts wherever they occur.

Fig. 3 is a side elevation; and Fig. 4 shows in elevation a detail of a clutch.

Figure 1:
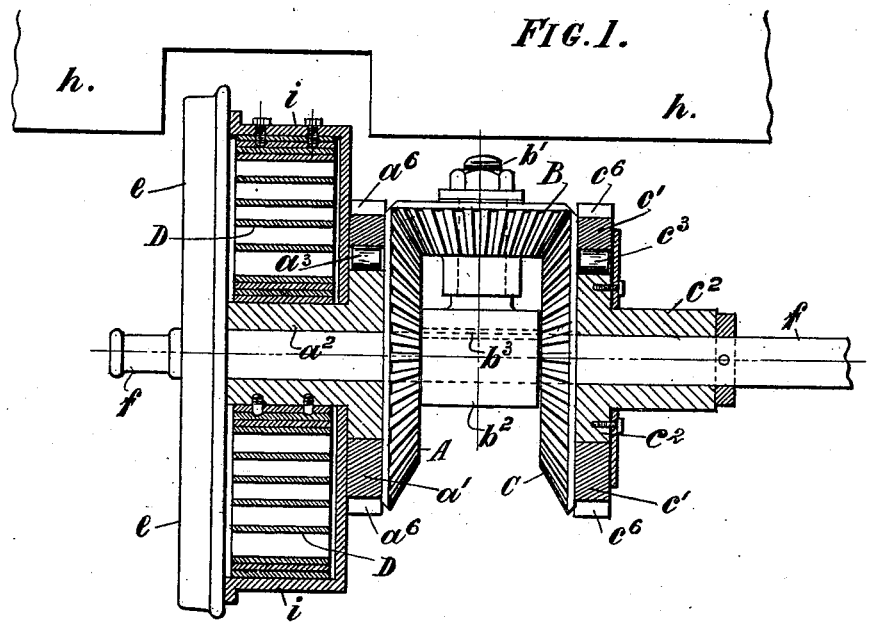
Figure 1 is a transverse section showing means according to this invention for stopping and starting a vehicle adapted to run in either direction.

In all the figures the triplet wheels are designated A, B, and C, and the spring D.

Referring in the first instance more particularly to Figs. 1 to 4, in this arrangement $e$ represents the wheel of, say, a tram-car; $f$ is the axle thereof which revolves with the wheel; and $h$ represents the bottom of the car.

$a'$ is the clutch ring, working in connection with a sleeve $a^2$ having a flange thereon, between which and the ring $a'$, rollers $a^3$ are provided. These parts form a clutch, the inner part or sleeve $a^2$ forming the hub or part of, or being fixed to, the bevel wheel A. In connection with another sleeve $c^2$ (to which the other bevel wheel C is fixed) is a clutch ring $c'$, and this works in connection with the flange of the sleeve $c^2$, through the gripping rollers $c^3$. Both the sleeves $a^2$ and $c^2$ (and of course the bevel wheels A and C fixed thereto) run loosely on the axle $f$. The small bevel wheel B is supported from the axle $f$ by a radial pin $b'$, mounted and fixed on the axle by the boss $b^2$ and key $b^3$. Thus the axle of the wheel B revolves with and about the axle $f$ when such axle revolves. The spring D is secured at the outer end to its containing case $i$, which is fastened on the inside of the car wheel $e$, while its inner end is secured to the sleeve $a^2$. The fastening by which the opposite ends of this spring are fastened to their said holding parts may consist of any suitable kind, such as pins, studs, hooks, or otherwise. In this arrangement there are two detents, $a^4$ and $c^4$. These detents are suspended by a pin or other suitable joint at their upper ends to any suitable part of or on the bottom of the car, and receive motion from the platform of the car by bars or rods $a^5$ $c^5$. They work, respectively, in connection with the clutch rings $a'$ and $c'$, and engage therewith by their points or heads, which are adapted to enter apertures $a^6$ and $c^6$, in the peripheries of the rings $a'$ $c'$.

The parts $a'$, $a^2$, $a^3$, and the parts $c'$, $c^2$, $c^3$, constitute self acting friction clutches, in the outer parts $a'$ and $c'$ of which are formed or provided, tapered pockets, in which the cylindrical rollers $a^3$ and $c^3$ are disposed and work. In the respective rings $a'$ and $c'$, the said pockets have the taper or inclination running in opposite directions. This is shown in Fig. 3, wherein the right hand half shows the ring $c'$ and its rollers and pockets, while in the lower part of the left hand side of this figure is shown the ring $a'$ with one of its rollers and pockets. The taper or inclination of the respective pockets running in opposite directions, is herein clearly shown.

Three sets of pockets and rollers of the friction clutches are shown provided in these figures, but of course any suitable number may be used. It is to be observed that the automatic action of these clutches is, that when the rollers $a^3$ and $c^3$ as the case may be, are, either through the action of their sleeves $a^2$ or $c^2$, or through the action of the rings $a'$ or $c'$, caused to move or become pressed toward or in the narrower part of the pockets in $a'$ and $c'$, the said parts $a'$ and $c'$ become clutched or frictionally coupled with their corresponding sleeves $a^2$ and $c^2$, and they therefore revolve together. And on the other hand, when the movement of the said parts $a'$ and $a^2$, or either of them, or $c'$ or $c^2$, or either of them, is such that the rollers $a^3$ or $c^3$ are caused to move or become pressed toward the wider parts of the pockets, then the parts $a'$ and $a^2$, or $c'$ and $c^2$, are in no wise connected, and are free to revolve about each other without having any effect upon each other. If then, the detents are put in gear, that is, they are made to engage with the outer ring $a'$ or $c'$, these rings will be held and prevented from turning, and the gear wheels A and B, on or to which the hubs or sleeves $a^2$ $c^2$ are formed or attached, will be kept from revolving in the direction of the arrows, respectively; whereas if the sleeves and wheels A or C are revolved in the opposite direction, no clutching takes place and they are free to revolve and without any effect upon the rings $a'$ or $c'$.

Figure 2:
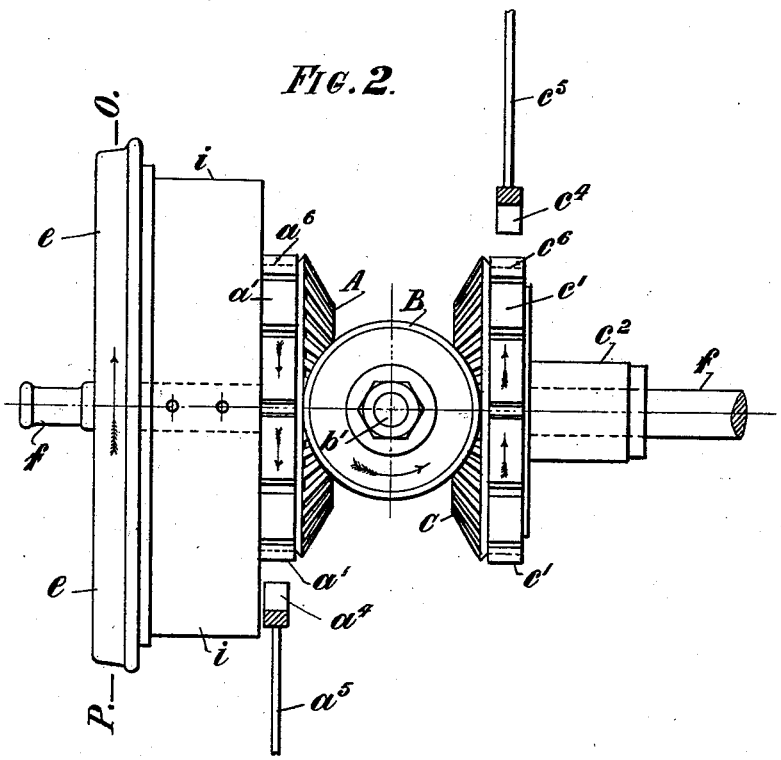
Fig. 2 is a plan of the same.

The spring D is so coiled that when wound up it tends to operate the different parts in the direction of the arrows in Fig. 2, and the clutches are so arranged that when they are engaged by the detents, they prevent the wheels A and C from revolving in the direction of the arrows respectively, while allowing free rotation in the direction opposite the arrows.

It may be here stated that the levers or rods $c^5$ would be connected to any suitable known form of lever, or foot or hand actuated device on the platform of the cars, and in a position convenient to its free and easy use by the driver; and it is also desired to repeat that one lever or actuating device only is disposed or used on the car at each end, and that by this single lever, all the actions herein described in connection with the stopping and starting apparatus can be performed.

The action of the invention is as follows:— Assuming the car to be running in the direction O P, the detent $c^4$ is thrown into gear with the clutch ring $c'$, and holds this ring in this engaged position, the hand or foot gear by which the engagement of the detent is made being pinned or locked in that position by any suitable known means. The wheel C is thus prevented by its clutch from running backward, that is, in the direction of the arrow, but it is free to run in the opposite or forward direction, and during the ordinary running of the car it does so. In this condition of things (the detent $a^4$ being disengaged from the clutch $a'$ and the car running), to stop the car and store the power in the spring D, the detent $a^4$ is moved by the driver, so as to engage with the clutch ring $a'$, and is held. The effect of this is, that the rotation of the sleeve $a^2$ causes the rollers $a^3$ to move into the narrower parts of the pockets in $a'$, and so bind or clutch $a'$ and $a^2$ together, and the wheel A being formed on $a^2$ or connected thereto, it also becomes held stationary. Thus we have one (the inner) end of the spring which is connected to $a^2$, held by this clutch, and the consequent action as regards the spring is therefore, that through its connection to the car wheel $e$, it becomes wound up by the further movement of the car and rotation of $e$. The result is that the stored energy in the moving car is transferred to and stored in the spring, and as it is taken up by the spring so the car is stopped or slowed. While the spring is being wound up and the wheel A held, the axle $b'$ which carries the wheel B will of course continue to be rotated about the axle $f$, and in this rotation the wheel B will be rotated upon its axle $b'$ and will cause the other toothed wheel C and clutch sleeve $c^2$ to be rotated in the same direction as the axles $b'$ and $f$ are rotating. The effect of this, as regards the clutch $c'$ is, that the rollers $c^3$ will be moved into the larger part of the pockets in the ring $c'$ so that perfect free movement of the part $c^2$ with respect to $c'$, is permitted. When, upon the winding up of the spring A the car ceases to move, it, that is the spring, first attempts to uncoil. This, if allowed, would drive the car wheels $e$ and axle $f$ in the direction P O, that is backward, but this action would cause the wheels D C to revolve in the direction of the arrows, and this cannot be done as the backward motion is instantly arrested by the rollers $c^3$ being forced by the rotation of the sleeve $c^2$ into the narrow parts of the pockets of $c'$ and the whole mechanism held at rest. The car can now be started in either direction, but assuming it is desired to restart it in the direction in which it was running, namely, in the direction O P, the detent $a^4$ is withdrawn from its engagement with $a'$ by the driver. Then the wheel A commences to revolve, and sets the wheel B in motion, thereby tending to drive C in the direction of the arrow; but the latter being held by its detent $c^4$, the wheel C acts as a fulcrum, and therefore, by the rotation of B round its axis, such axis and with it the axle $f$ of the car wheel also revolve, and in the direction O P. During this action, the wheel A overruns the axle $f$, that is, makes two turns while the axle makes one, so that the spring is uncoiled although it revolves with the axle. When the spring is uncoiled, and C is free from pressure, the clutch sleeve $c^3$ disengages itself, and the wheel C runs freely with the car axle, although the detent $c^4$ remains engaged with $c'$. If, on the other hand, it had been desired when the spring was wound up and the car stopped in the manner above described, to restart the car in the opposite direction, namely, in the direction P O, the detent $a^4$ would be left locked and engaged with $a'$, while the detent $c^4$ would have been drawn from the clutch ring $c'$. The wheel A would thus have been held and prevented from revolving in the direction of the arrow, and the outer end of the spring attached to the drum or casing $i$ would commence to drive the wheel $e$ in the direction P O. The rotation of the axle of B would cause the wheel C to be revolved at twice the speed of the axle $f$ without affecting the action of the car in any wise or the operation of the parts. In such a case, when the spring is uncoiled, the clutch ring $a'$ frees itself and allows the wheel A to revolve with the car axle. In the case wherein the car is running in the direction P O, the detent $a^4$ is left locked or engaged with the clutch ring $a'$, the detent $c^4$ being disengaged from its clutch. The car, in this case, may be stopped when required by throwing the detent $c^4$ into engagement with $c'$. The wheel C being thus held stationary by its clutch, the wheel B (carried round by its axle $b'$) is caused to revolve about said axle and upon the wheel C, and thereby driving the wheel A at double the speed of the axle $f$, so that the spring which is connected to the sleeve $a^2$ is wound up by the wheel A over-running, that is, running faster than the axle $f$. Upon the car coming to rest, it at first tends to run backward in the direction O P, but this would necessitate the wheel A running in the direction of the arrow, which it is prevented from doing by its clutch rollers $a^3$ being pressed into the narrower parts of their pockets, and thereby automatically clutching or gripping the sleeve $a^2$ and the wheel A, and the car remains stationary. The spring being now wound up, and both detents engaged, the car can be started in either direction, as previously explained.

The invention so far described in connection with the vehicle having revolving axles, is equally applicable to vehicles of which the wheels run on fixed axles. In such a case one end of the spring will be attached to the vehicle wheel, while the other end is attached to the gear wheel A, which will be so mounted as to revolve upon an extension (inward) of the hub of the vehicle wheel, the gear wheel B, being carried upon an arm or axle $b'$ rigidly fixed upon the same extension, the wheel C, running loosely upon the fixed axle or otherwise. Such a construction would be suitable for omnibuses, and room would be found between the wheel and the body of the vehicle by making the parts of suitable size.

In order that the detents may be easily withdrawn from the clutch rings, they may be inclined at the part where the rings $a'$ or $c'$ bear upon them so that a tendency is for the rings to disengage the detents. Or, in lieu thereof, the pivot or support of the detent may be so placed in relation to the rings that the self disengaging tendency is afforded.

The levers or other means for operating the detents may be arranged to work entirely from either end, or from both ends of the car instead of being divided as described; the particular arrangement of levers or operating devices desired is however a mere matter of compliance with different conditions of the operations required.

In some cases the clutches above specified may be dispensed with; for instance, in one case, the apertures or notches in which the detents enter in engaging, may be provided in a ring rigidly attached to the wheels A C in lieu of the clutch rings $a'$ and $c'$. The mechanism in such a case would be operated by putting the detents into and out of gear with these parts for stopping, prevention of backing, re-starting, &c., as required. For example, to stop the car, one detent is thrown into gear with the engaging wheel and such wheel is held, and the spring winds up. Then another detent is thrown into gear with the other wheel and backing is thereby prevented. When it is desired to start again first one detent is withdrawn, whereupon the spring unwinds and when the spring is unwound the other detent is withdrawn. Or, as a further modification, in lieu of the clutches above specified, detents having spring nosed pawls may be used in conjunction with ratchet teeth in connection with the wheels A and B, such teeth say being provided on a flange thereon; for instance in lieu of the plain flanges of the sleeves $a^2$ and $c^2$, ratchet teeth would be provided on their peripheries. These pawls would slip over the ratchet teeth when the wheels were rotating in one direction, and hold them in the other; by this means, rotation would be allowed in one direction without taking the detents out of gear.

As another modification of the above described arrangement, suitable for a single ended car running in the direction O P, the clutches may be dispensed with on the wheels A and C, and a rigid ring only, with apertures for engaging with the detents, employed; and in the place of the clutches, a single clutch would be employed in the boss or collar $b^2$ of the axle $b'$ of B in place of a rigid attachment by means of a key as in Figs. 1 to 4. The car in this case would be stopped by engaging the detent $a^5$ with the wheel A, the clutch aforesaid slipping. To start the car, the wheel A is released, when the axle will be driven by the clutch in the said boss or collar, the wheel C being held stationary during this time by its detent—which is left permanently in gear, except when it is required to back the vehicle.

Having now particularly described this invention, I declare that what is claimed in respect thereof is—

1. In apparatus for stopping and starting vehicles the combination of a driving wheel or axle thereof, a spring connected therewith at one end, gear wheels one of which is connected with the spring at its opposite end, and comprising two outer wheels and an intermediate wheel gearing with said wheels, said intermediate wheel axis being fixed on and revolving with said axle or wheel, and one of said outer gear wheels being connected to the driving wheel or axle, and detent mechanism connected to a stationary part of the vehicle and adapted to engage with and disengage from said gear wheels, whereby said spring can be wound up in either direction and the energy thereby restored can be given out to start or propel the vehicle either in the same direction or in the opposite direction, substantially as described.

2. In apparatus or mechanism for stopping or starting vehicles, the combination of a driving wheel or axle, gear wheels carried upon and revolving with said wheel or axle, an intermediate wheel meshing with said gear wheels and the axis of which is fixed on and revolves with said wheel or axle, a spring carried upon and connected with said wheel or axle and with one of said outer gear wheels, and a detent or holding device adapted to engage with or hold one or other of said outer gear wheels or release same, whereby by detenting or holding, the spring is wound up, and by releasing said wheel, the spring unwinds and drives the vehicle, substantially as described.

3. In apparatus or mechanism for stopping or starting vehicles, the combination of a driving wheel or axle, gear wheels carried upon and revolving with said wheel or axle, an intermediate wheel meshing with said gear wheels and the axis of which is fixed on and revolves with said wheel or axle, a spring carried upon and connected with said wheel or axle and with said gear wheels, clutches adapted to automatically grip with said gear wheels when moving in one direction and slip or run freely in the opposite direction, and detent or holding mechanism supported from the car, and adapted to engage with and disengage from said clutches by which actions the clutches come into, or are thrown out of gear with said gear wheels, and motion in the action of coiling up and uncoiling the spring, is obtained in either direction, substantially as described.

4. In apparatus or mechanism for stopping and starting vehicles, the combination with a driving wheel or axle thereof, of a spring, gear wheels carried upon and revolving with said wheel or axle, an intermediate wheel meshing with said gear wheels and the axis of which is fixed on and revolves with said wheel or axle, and automatic clutches in connection with the outer wheels of said gear wheels, consisting of an outer ring, an inner part, and rollers between said parts and working in pockets with inclined surfaces whereby the gripping effect is obtained by the rollers when in the narrow part of the pocket, and the clutching effected, while in the wider part no connection is made, substantially as described.

5. In apparatus or mechanism for stopping and starting vehicles, the combination with the revolving axle $f$, of the vehicle, of the two gear wheels A, C, mounted loosely on said axle $f$ the intermediate gear wheel B meshing with the gear wheels A and C, and mounted upon an axis radial to the axle $f$, and revolving therewith, a spring D fixed at one end to a road wheel of the vehicle mounted on the axle $f$ and at the other end to one of said gear wheels A C, automatic clutches comprising rings $a'$ and $c'$, mounted outside the hubs of the wheels A, C, rollers $a^3$, $c^3$, interposed between the rings $a'$, $c'$, and said hubs and working in inclined pockets therein, and detent or holding mechanism adapted to engage with said rings $a'$ and $c'$, substantially as described.

In testimony whereof I have hereunto set my hand in presence of two witnesses.

SAMUEL AUGUSTINE DE NORMANVILLE.

Witnesses:
J. A. COUBROUGH,
R. W. ARMISTEAD,
*Both of 15 Water Street, Liverpool.*